United States Patent
Jackson et al.

(10) Patent No.: US 7,369,222 B2
(45) Date of Patent: May 6, 2008

(54) WHEEL ALIGNER MEASUREMENT MODULE ATTACHMENT SYSTEM

(75) Inventors: David A. Jackson, Point Roberts, WA (US); Brian Gray, Conway, AR (US); Steven W. Rogers, Conway, AR (US); Stephen L. Glickman, Los Gatos, CA (US); George M. Gill, Vilonia, AR (US); James L. Dale, Jr., Conway, AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 15 days.

(21) Appl. No.: 11/432,766

(22) Filed: May 12, 2006

(65) Prior Publication Data

US 2006/0274303 A1 Dec. 7, 2006

Related U.S. Application Data

(60) Provisional application No. 60/680,497, filed on May 13, 2005.

(51) Int. Cl.
 *G01B 11/275* (2006.01)
(52) U.S. Cl. .................... 356/139.09; 356/155
(58) Field of Classification Search ........... 356/139.08, 356/155; 33/203.18, 286, 288
See application file for complete search history.

(56) References Cited

U.S. PATENT DOCUMENTS

| | | | |
|---|---|---|---|
| 3,901,604 A | 8/1975 | Butler | |
| 4,745,469 A | 5/1988 | Waldecker et al. | |
| 4,899,218 A | 2/1990 | Waldecker et al. | |
| 5,519,488 A | 5/1996 | Dale, Jr. et al. | |
| 5,535,522 A | 7/1996 | Jackson | |
| 5,724,129 A | 3/1998 | Matteucci | |
| 5,724,743 A | 3/1998 | Jackson | |
| 5,809,658 A | 9/1998 | Jackson et al. | |
| 6,341,013 B1 | 1/2002 | Battiti et al. | |
| 6,397,164 B1 * | 5/2002 | Nobis et al. ............ 702/150 |
| 6,690,456 B2 | 2/2004 | Bux et al. | |
| 6,968,282 B1 | 11/2005 | Jackson et al. | |

(Continued)

FOREIGN PATENT DOCUMENTS

EP    0 895 056 A2    3/1999

(Continued)

OTHER PUBLICATIONS

International Preliminary Report on Patentability and Written Opinion issued in International Application No. PCT/US2006/018505,dated Nov. 11, 2007.

*Primary Examiner*—Isam Alsomiri
(74) *Attorney, Agent, or Firm*—McDermott Will & Emery LLP

(57) ABSTRACT

In a vehicle alignment system an optical sensing mechanism is structurally coupled to a vehicle supporting lift for movement in unison with the lift so that the field of view of the sensing mechanism encompasses a wheel of a vehicle positioned on the lift during lift movement. Sensing modules may be selectively placed so that they are in correspondence with the vehicle wheel base. Modules may be deployed to extend outwardly from the lift, for viewing the wheel during an alignment procedure, or retract to a adjacent the lift for stowing. A protective cover extends above the sensing modules in the retracted position.

15 Claims, 12 Drawing Sheets

| U.S. PATENT DOCUMENTS | | | |
|---|---|---|---|
| 2002/0027651 A1* | 3/2002 | Jackson et al. | 356/139.09 |
| 2003/0147068 A1 | 8/2003 | Remo | |

FOREIGN PATENT DOCUMENTS

| EP | 1 335 181 A1 | 8/2003 |
|---|---|---|
| JP | 01252497 | 9/1989 |
| WO | WO 99/03018 A1 | 1/1999 |
| WO | WO 2005/090906 A1 | 9/2005 |

* cited by examiner

WHEEL ALIGNER MEASUREMENT MODULE ATTACHMENT SYSTEM

RELATED APPLICATION

This application claims the benefit under 35 U.S.C. § 119(e) of U.S. Provisional Patent Application No. 60/680,497 filed on May 13, 2005, which is incorporated by reference herein its entirety.

TECHNICAL FIELD

The present disclosure relates to visual wheel alignment systems, more particularly to the positioning of optical sensors for unobstructed field of view of vehicle wheels.

BACKGROUND

Known systems for alignment of wheels of motor vehicles employ computer-aided, three-dimensional machine vision alignment apparatus. Examples of so-called "3D alignment" systems are described in commonly assigned U.S. Pat. No. 5,724,743 to Jackson, entitled "Method and apparatus for determining the alignment of motor vehicle wheels," and commonly assigned U.S. Pat. No. 5,535,522 to Jackson, entitled "Method and apparatus for determining the alignment of motor vehicle wheels," both of which are commonly assigned to the assignee of the present application and incorporated herein for reference in their entireties. Sensors, such as cameras, view alignment targets affixed to the wheels in a known positional relationship to determine the position of the alignment targets relative to the alignment cameras. The alignment cameras capture images of the targets. From these images, the spatial orientation of the wheels can be determined and related to specification alignment characteristics. Wheel alignment adjustments can be made, while maintaining camera sensing, until the captured images correspond to specification values.

More recent versions of 3D alignment systems favor using identifiable wheel features to determine the spatial orientation of a wheel, in lieu of attaching targets to the wheels. With such operation, the cost of targets, a variety of attachment devices needed for different vehicle models, and the technician labor involved in the proper attachment of the targets, is eliminated. A wheel characteristic that can be sensed to derive the necessary spatial relationships, for example, may be the boundary between tire and wheel, or simple targets attached to the wheel.

These machine vision wheel alignment systems utilize measurement modules that need an unobstructed side view of the vehicle wheels. Computer software processes the images to distinguish the wheel from the tire and calculate wheel alignment parameters based on the extracted image of the wheel. The measurement modules typically include one or more digital cameras, illumination devices for illuminating the wheel during image capture, and a structure for supporting these various devices. A typical wheel alignment system may have one measurement module for each wheel of the vehicle being measured. To optimize measurement performance the distance from the wheel to the measurement module must be predetermined and allowed to vary over a fairly narrow range. It is advantageous to have the measurement module in a position such that it is longitudinally aligned with the center of the wheel it is measuring.

Systems that have been developed to date typically use self-standing measurement modules that contain the actual measuring devices. The measurement modules are installed at a fixed height to the side of the vehicle lift and can be in the way of the shop personnel when they are not being used for a wheel alignment. During a wheel alignment measurement, the vehicle is usually placed on a vehicle lift. Normally the operator will raise or lower the lift during the alignment process to make adjustment of the vehicle easier. The cameras require very wide angle lenses to be able to capture wheel images for vehicles with various wheelbases and for vehicles that are moved relative to stationary measurement modules. The wheel alignment process also may require sensing while the vehicle is moved longitudinally when the lift is in the lowered position.

SUMMARY OF THE DISCLOSURE

The subject matter described herein overcomes these short comings. An optical sensing mechanism is structurally coupled to a supporting lift for movement in unison with the lift so that the field of view of the sensing mechanism encompasses a wheel of a vehicle positioned on the lift during lift movement. Preferably, the optical sensing mechanism includes a sensing module in which a pair of sensors, which may be cameras, are positioned at a fixed distance from each other. The distance is set to place the pair of sensors along a longitudinal direction of the lift approximately at opposite ends of the wheel diameter so that the field of view of each sensor encompasses a substantial portion, or the entire side, of the wheel. Alternatively, a single sensor may be utilized.

A mounting member may be attached to each side of the lift. A plurality of positions are provided in each mounting member for securely mounting a pair of the sensing modules to the member and, thus, to the lift. The mounting member positions are located such that one or both of the sensing modules may be selectively placed so that both modules are in correspondence with the vehicle wheel base.

A deployment mechanism is coupled between the lift and the sensing module. In an extended position of the deployment mechanism, the sensing module extends outwardly from the lift for viewing the wheel during an alignment procedure. In a retracted position of the deployment mechanism the sensing module is adjacent the lift for stowing when there is no alignment procedure taking place. The retracted position is displaced in the longitudinal direction of the lift from the extended position. A protective cover is attachable to the lift to extend above the sensing module when it is in the retracted position. The deployment mechanism can be locked in each of the extended position and retracted position for stabilizing the sensing module.

A separate protective cover may be provided for each sensing module. Alternatively, a single protective cover can be provided to extend over the pair of sensing modules on each side of the lift. In the latter case, a mounting member position is provided to position one of the pair of sensing modules such that the pair of sensing modules are adjacent to each other in their retracted positions.

Additional advantages will become readily apparent to those skilled in this art from the following detailed description, wherein only the preferred embodiments are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Implementations of the present invention are illustrated by way of example, and not by way of limitation, in the figures of the accompanying drawings and in which like reference numerals refer to similar elements.

DETAILED DESCRIPTION

Figure 1:
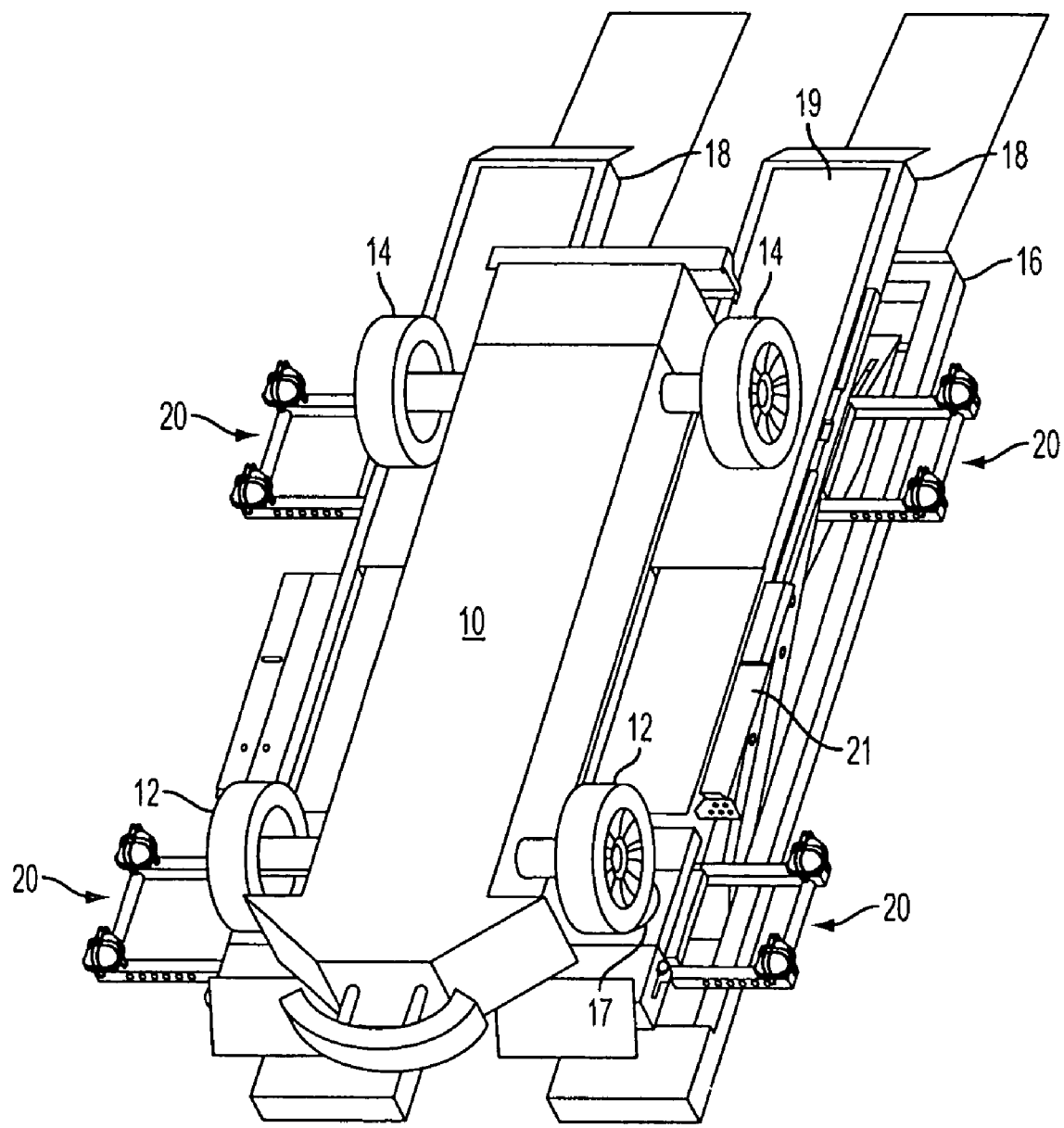
FIG. 1 is a perspective view of an aligner module attachment system in a lowered position in accordance with the present invention.

FIG. 1 is a perspective view of an exemplary module attachment system. Vehicle 10 is schematically represented with front wheels 12 and rear wheels 14 supported by lift 16. The front wheels rest on turntables 17, the back wheels on skid plates 19. Structurally coupled to runways 18 of the lift are sensing modules 20 at each wheel. Protective cover 21 is mounted to the lift between modules 20. Sensing module 20 and a deployment mechanism that couples it to the lift are shown in more detail in the partial perspective view of FIG. 2. The sensing module 20 comprises a pair of sensors, or pods, 22 held at a fixed distance by bar 24. Each sensor is partially surrounded by a protective guard cage 26. The module is joined to a deployment mechanism comprising struts 28 and 30 and beam member 32. Beam member 32 may be affixed to the lift runway 18 by bolts or other suitable means.

Figure 2:
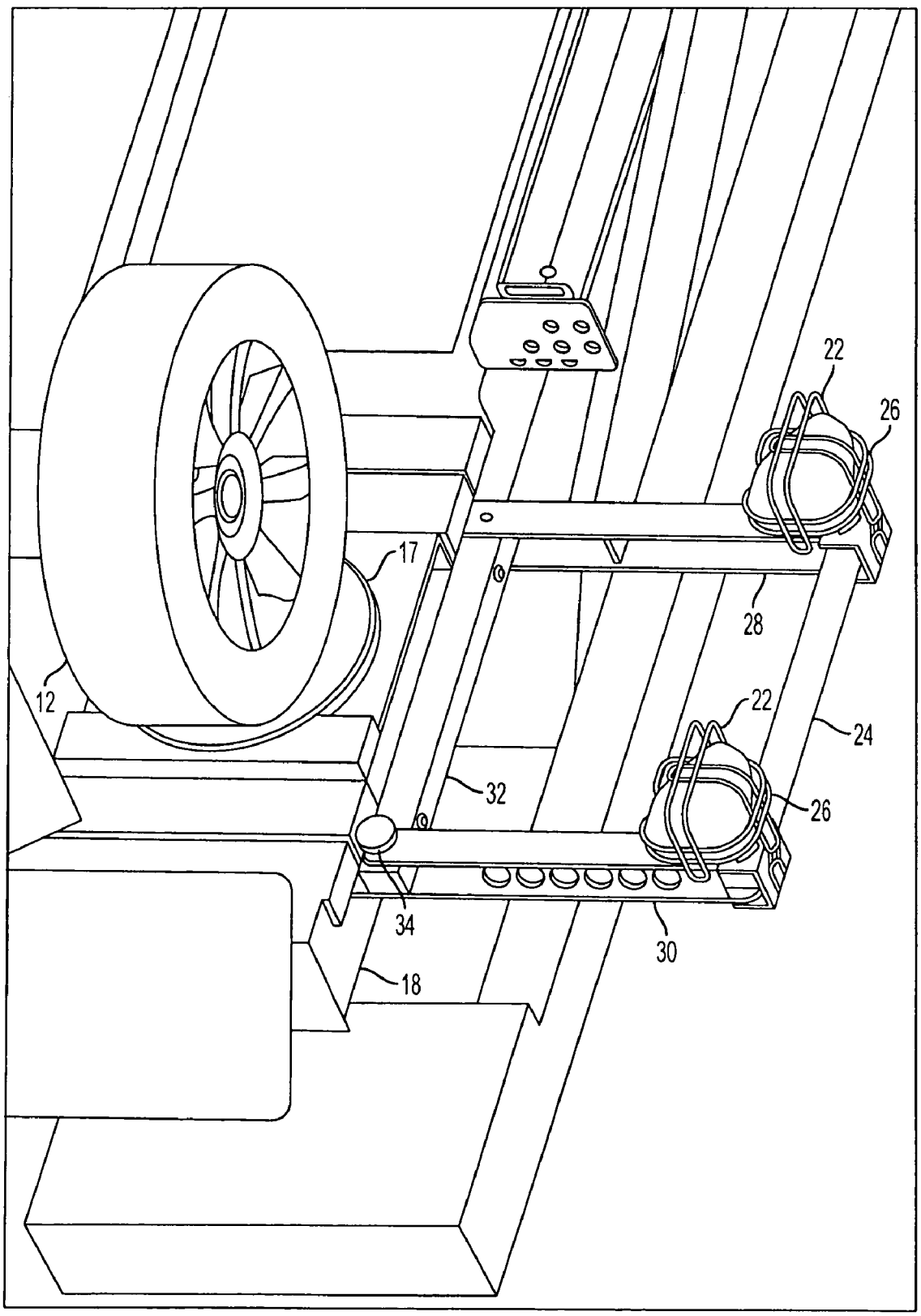
FIG. 2 is a partial perspective view of a sensing module of the system of FIG. 1 deployed in an extended position.

As shown in FIGS. 1 and 2, the sensing module 20 is in a position that extends outwardly from the lift. The distance between the pair of sensors preferably is substantially equal to the diameter of an average vehicle wheel. The beam member 32, struts 28 and 30 and bar 24 are configured as a rectangle, wherein bar 24 is substantially parallel to the longitudinal direction of the lift. In this position, the wheel is in the field of view of both sensors and an alignment procedure can take place. Each of the four corners of the deployment mechanism contains a pivot element, not shown. A ball detent or equivalent means may be included to set the deployment mechanism at the rectangular configuration shown. Locking knob 34 can be used to hold the setting.

Figure 3:
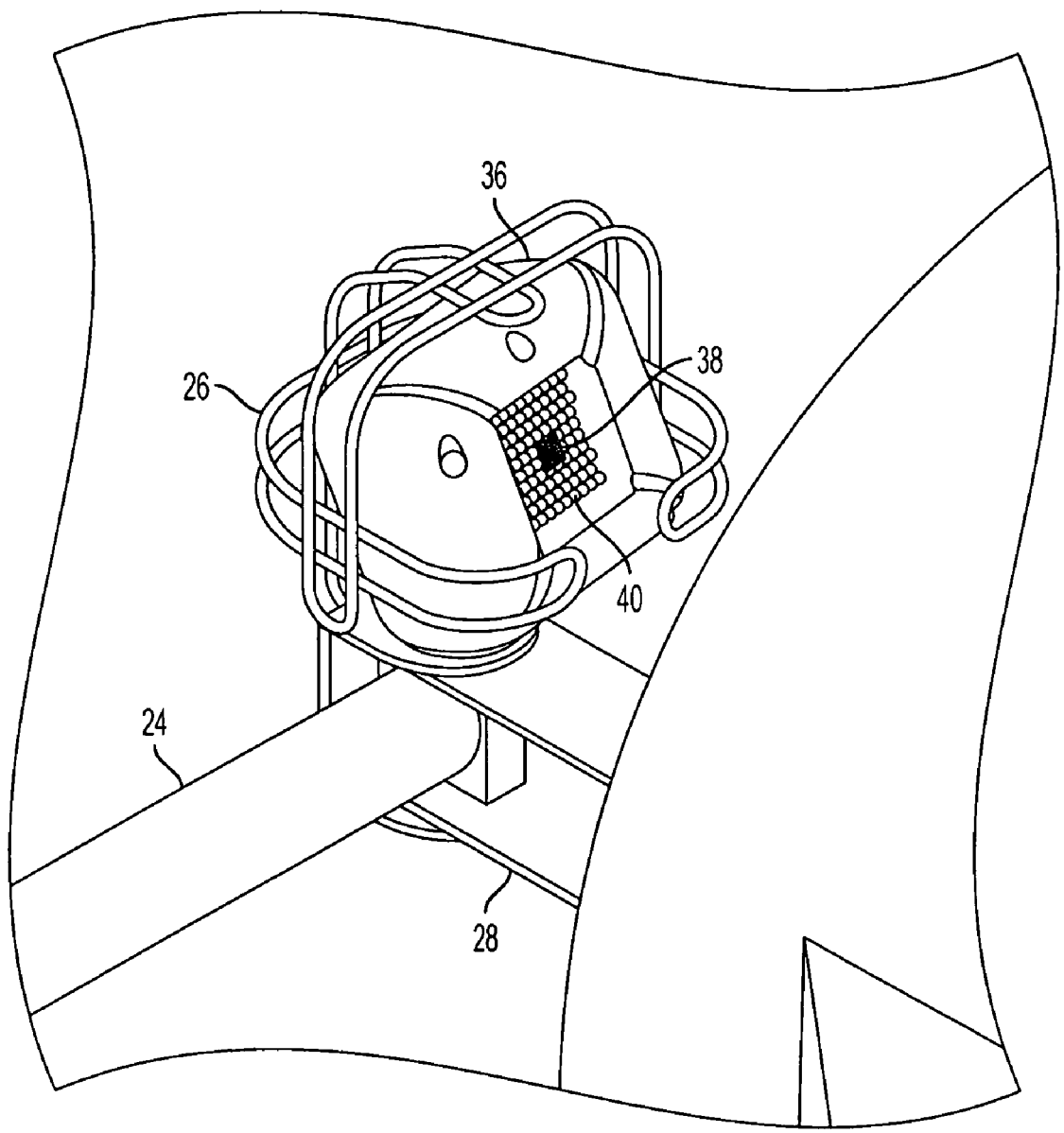
FIG. 3 is a partial perspective view of a sensor configured in the system of FIG. 1.

Sensor 22 is shown in more detail in FIG. 3. Housing 36 includes a camera having a lens 38 surrounded by illumination devices 40. An array of LEDs direct radiation, which may be infrared, to the wheels. The camera, via lens 38, captures a digital image of the tire and wheel combination. In a well known manner, computer software can process the images obtained from both sensor cameras to distinguish the wheel from the tire and calculate wheel alignment parameters based on the extracted image of the wheel. With a sensing module mounted to the lift at each of the vehicle wheels, image input is obtained to permit all necessary alignment adjustments.

Figure 4:
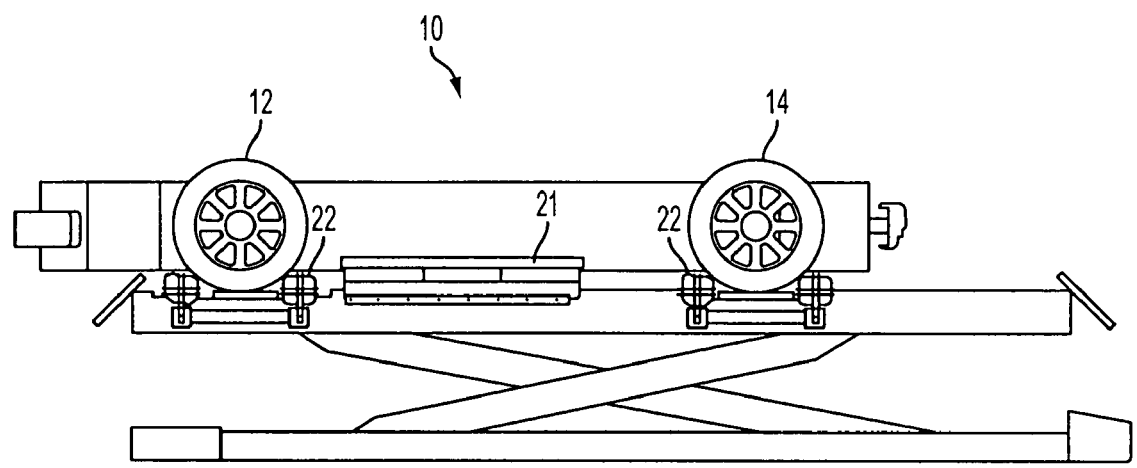
FIG. 4 is a side view of the system of FIG. 1 in a raised position.

FIG. 4 is a side view of the system of FIG. 1 with the lift raised. By coupling the sensing modules directly to the lift they automatically move up and down with the vehicle. The wheel is kept within the field of view of the sensors. The spatial orientation of the wheel with respect to the sensors is maintained as the height of the lift is varied.

Figure 5:
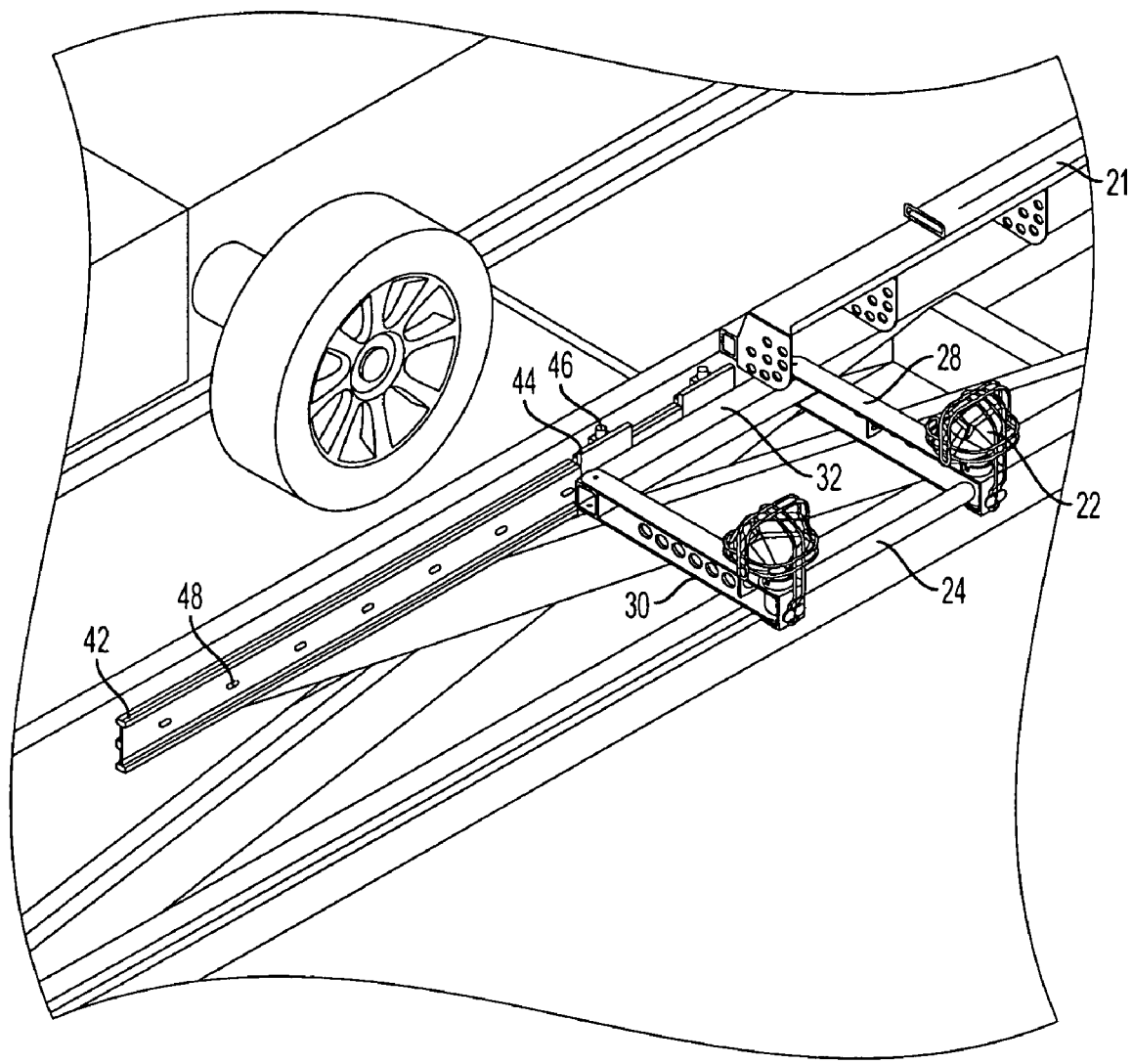
FIG. 5 is a partial perspective view of a variation of the aligner module attachment system of FIG. 1.

The necessity of very wide angle lenses can be avoided by centering the sensing modules longitudinally on the wheels as closely as possible. The arrangement illustrated in FIGS. 1 and 4 provide this objective. FIG. 5 is a partial perspective view of a variation of the aligner module attachment system to accommodate for a wide dimensional range of vehicle wheelbase dimensions. A rail 42 is attached to each side of the lift. Hanging clip elements 44 are engaged within a slot running the length of rail 42. Knobs 46 in a loosened state permit the clip elements to slide longitudinally along the rail 42. When knobs 46 are tightened, the clips are held in position on the rail. Of course, other means for locking the clips may be employed. Beam member 32, which is not affixed to the lift runway as in FIG. 1, is secured to the clip elements 44. The sensing module is moved in concert with the clips along the rail to obtain the spatial orientation of the wheel with respect to the sensors illustrated in FIG. 1. The modules for the forward and rear wheels can thus be set to be in correspondence with any vehicle wheel base.

Slots 48 in the rail 42 provide a guide to the positioning of the clips. Rail 42 may extend along the lift a length sufficient to accommodate both front and rear wheel sensing modules. The longitudinal position of both modules can thus be adjusted. Alternatively, one of the sensing modules can be mounted to be stationary as shown in FIG. 1, and the rail 42 can extend a length sufficient to adjust the position of the other sensing module appropriately to the dimension of any vehicle wheelbase.

Figure 6:
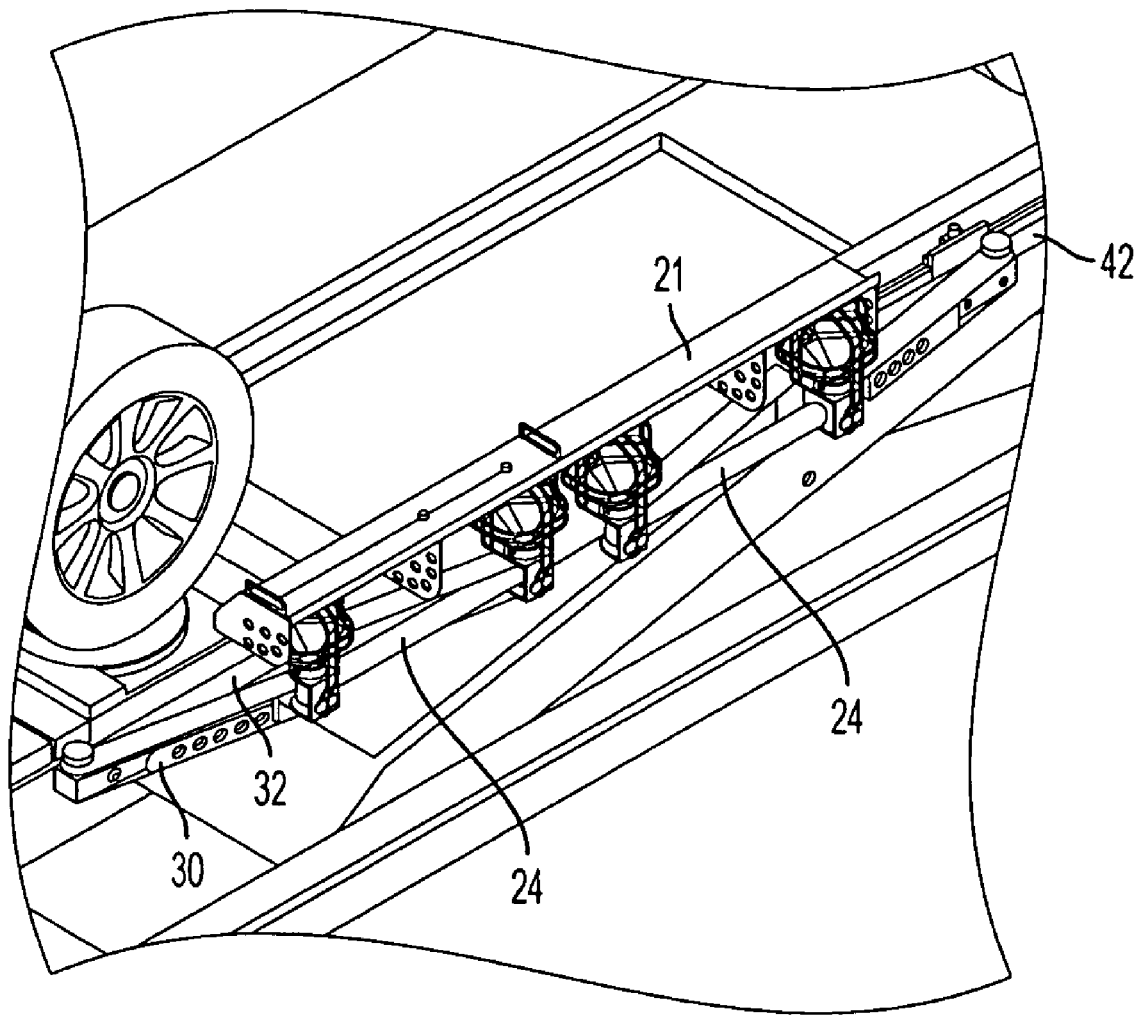
FIG. 6 is a partial perspective view of a pair of sensing modules of the system of FIG. 1 in retracted position.

The locking knob 34, shown in FIG. 2, can be loosened so that the deployment mechanism can pivot about the four corners to assume a parallelogram configuration. When not in use, the mechanism can be pivoted to the retracted position shown in FIG. 6. In the retracted position, sensors 22 and connecting bar 24 are stowed under protective cover 21. The locking knob can then be tightened to maintain the mechanism in the retracted position. As illustrated, in the retracted position both modules are side-by-side under the cover 21. To attain these positions, the left hand deployment mechanism has pivoted in a counterclockwise direction and the right hand deployment mechanism has pivoted in the clockwise direction. The right hand module has been repositioned along rail 42 for a parked deployment alongside the left hand module.

Figure 7:
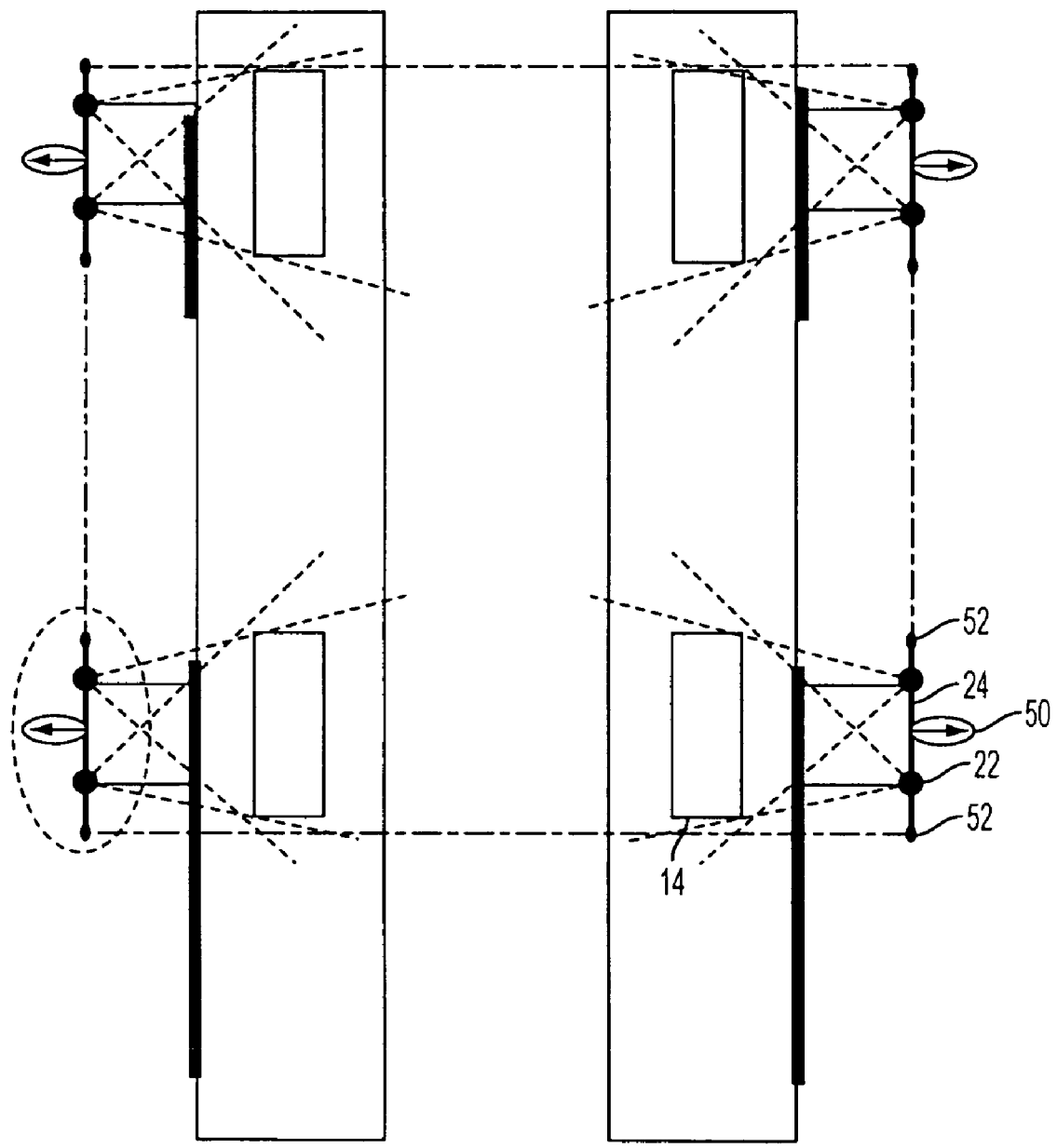
FIG. 7 is a schematic diagram of the system of FIG. 1 including additional features.

The system of FIG. 1 may be provided with additional features as illustrated in the schematic diagram of FIG. 7. Built into each module is a two-axis gravity gauge 50 and a pair of toe sensors 52. The toe sensors 52 reference each of the modules with respect to each other (angularly) in the toe plane (horizontal plane). The toe sensor can be a linear camera and at least one LED or laser light source on each module. Alternatively the toe sensors can be replaced with a 3D measurement apparatus such as used in the previously referenced three-dimensional machine vision alignment apparatus and consisting of a camera containing a 2 dimensional sensor array attached to one pod that measures the three-dimensional position of a known target attached to another pod.

If all of the cameras in a given system are rigidly fixed relative to Earth, the system can be calibrated with a gravity referenced target so that each camera knows the direction of gravity relative to itself. When the cameras are calibrated in this manner they can measure angles of the wheels relative to gravity. If any camera moves relative to Earth, in the absence of a gravity gauge, it must be recalibrated.

With the use of the gravity gauges, a relative position calibration between the camera and the attached gravity gauge in a measurement module need only be performed one time. This calibration teaches the camera its orientation relative to a vertical gravity vector measured by the gravity gauge. During normal operation the gravity gauge value is measured continuously and the gravity measurement is used to correct the measurements made by the camera system for changes in the orientation of the camera relative to the calibrated zero gravity vector of the camera. The calibration of the camera/gravity gauge assembly can be done in the factory at the time of assembly for system configurations that have measurement modules rigidly connected to a gravity gauge, or alternatively it could be done on site in the wheel alignment shop. As the gravity gauges provide a continuous gravity reference measurement available for the system, there is no need to manually recalibrate the measurement module if the camera moves relative to Earth. Camber values can be determined relative to this gravity reference. If the measurement module moves, the change in its orientation to the gravity vector is measured and the calculated camber values are adjusted accordingly.

The gravity gauges can also be used to detect vibration in the measurement modules. For example, after the position of a measurement module is adjusted in a movable measurement module system, it may be desirable to monitor the stability of the gravity gauge readings to make sure the module is stable before having the camera collect images. As the gravity gauges have much faster response time than the cameras, they provide a better stability indicator. Secondly, if vibration is detected in an image, the gravity gauge can be used to determine if the vibration is due to movement of the measurement module or the object. It may also be possible to determine the best time to take a camera reading based on the vibration signal obtained from the gravity gauge. By knowing how the camera is moving it could be enabled to make a measurement at the moment that its position is the most stable.

By attaching the sensing modules directly to the lift they automatically move up and down with the vehicle, keeping the wheel within the field of view of the sensors. The sensing modules may be positioned on the lift to correspond with any vehicle wheel base and provide an unobstructed view of the wheels. Attachment of the modules to the lift avoids the obstructions caused by conventional self-standing systems. The retraction mechanism allows the modules to be stowed in a protected space, when not in use.

Figure 8:
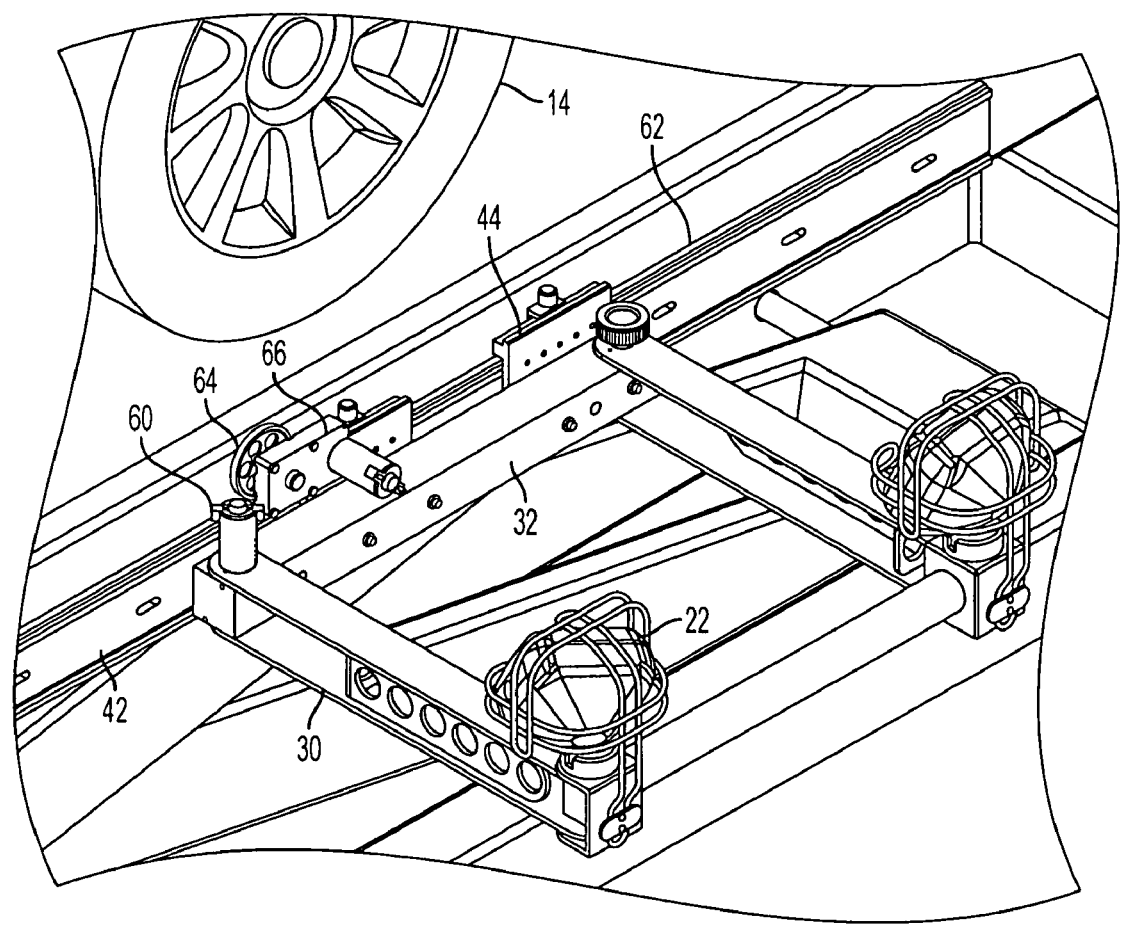
FIG. 8 is a partial perspective view of a variation of the aligner module attachment system of FIGS. 1-6.

In a variation of the structure depicted in FIGS. 1-6, positioning of the modules may be performed automatically, as depicted in FIG. 8. Motor 60 is coupled to the pivot element at one of the four corners of the deployment mechanism. Track 62 is attached to the side of the lift rack. Pinion 64, attached to the deployment mechanism, is engaged with track 62. Pinion 64 is coupled to stepper motor 66.

Figure 9:
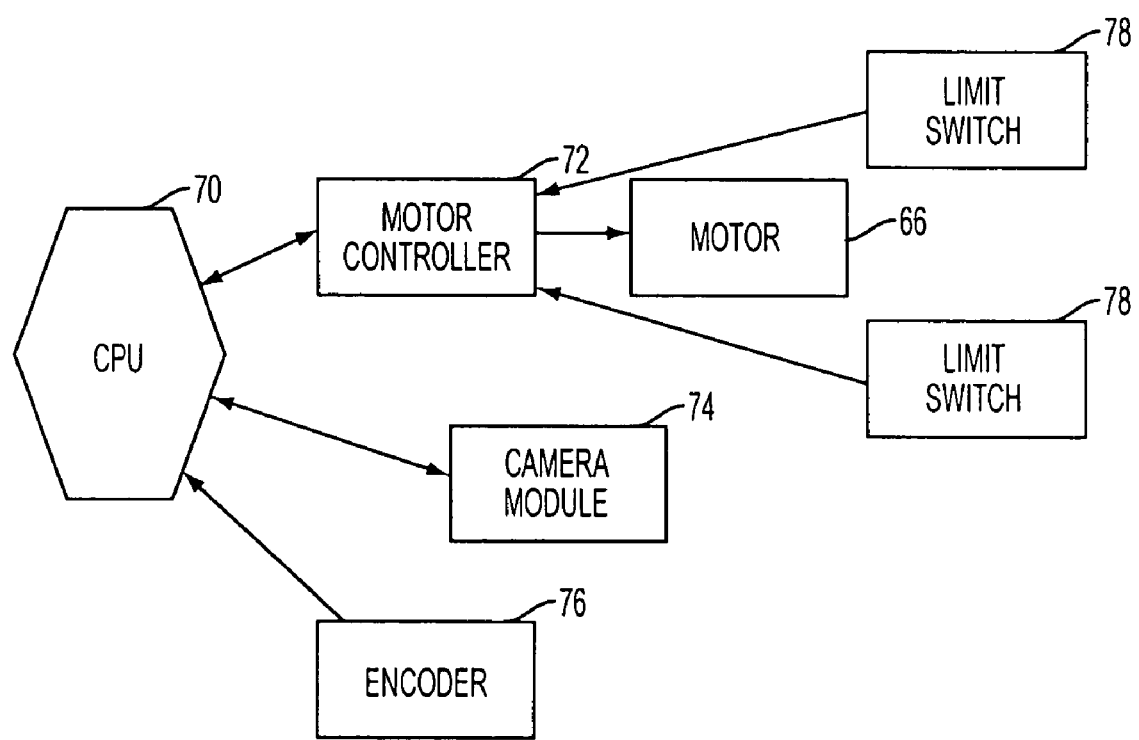
FIG. 9 is a block diagram for controlling deployment mechanism operation.

FIG. 9 is a block diagram for controlling deployment mechanism operation. Coupled to CPU processing unit 70 are motor controller 72, camera module 74 and encoder 76. While shown only schematically, camera module 74 represents all sensors in the module pods that provide sensed image information to the CPU 70. Encoder 76 may be coupled to motor 66 to translate rotational movement thereof to linear travel along the track 62. The encoded information is output to the CPU 70. The CPU outputs signals to the motor controller 72 for controlling motor 66. Limit switches 78 located at each end of the range of permissible module travel are coupled to the motor controller. The schematic representation of motor block 66 may also represent motor 60 which, under the control of the motor controller, is activated to pivot the deployment mechanism to its open and closed positions. The extent of travel in each of these positions can be controlled by limit switches 78.

In operation, a technician starts a new alignment with a user input to the CPU 70. The four modules are moved out of their protective cover to extend outward of the lift rack, for example, approximately two feet, by means of motor 60. The mechanism is then driven by stepper motor 66 along the lift rack to a pre-defined location. In most cases, the pre-defined location is at the rearward position of travel on the track and within a predictable wheel location window. The positional relationship between the sensors and the lift rack are calibrated prior to alignment sensing. The technician drives the vehicle onto the lift rack. As the wheel passes in front of its sensing module, the camera(s) take images of the wheel. The wheel is tracked by moving the deployment mechanism forward until it is properly oriented with respect to the wheel. As an alternative to taking images of the wheel for this purpose, measurements may be made by sensing markers or targets placed on the wheels. These and other alternatives are discussed below.

The modules may include one or more sensors to measure distance between front and rear mechanisms. For example, two LED light sources may be separated by a known amount in one module and a linear optical sensor placed in the other module. By measurement of the sensed separation of lights output by the LED lights and the use of triangulation, the distance between modules can be determined. Yet another way to determine module position is to convert rotational steps of the stepper motor 66, attached to the deployment mechanism, to linear motion with respect to a home position.

Instead of trying to find the wheel as the vehicle is driven onto the lift, the technician may enter data that identifies the type of vehicle that is to be measured. A database can be constructed that contains preferred alignment numbers with specifications obtained from the OEMs as well as wheelbase information stored for the vehicles. The deployment mechanisms can then be moved to their correct position by reading an encoder attached to the rack.

Figure 10:
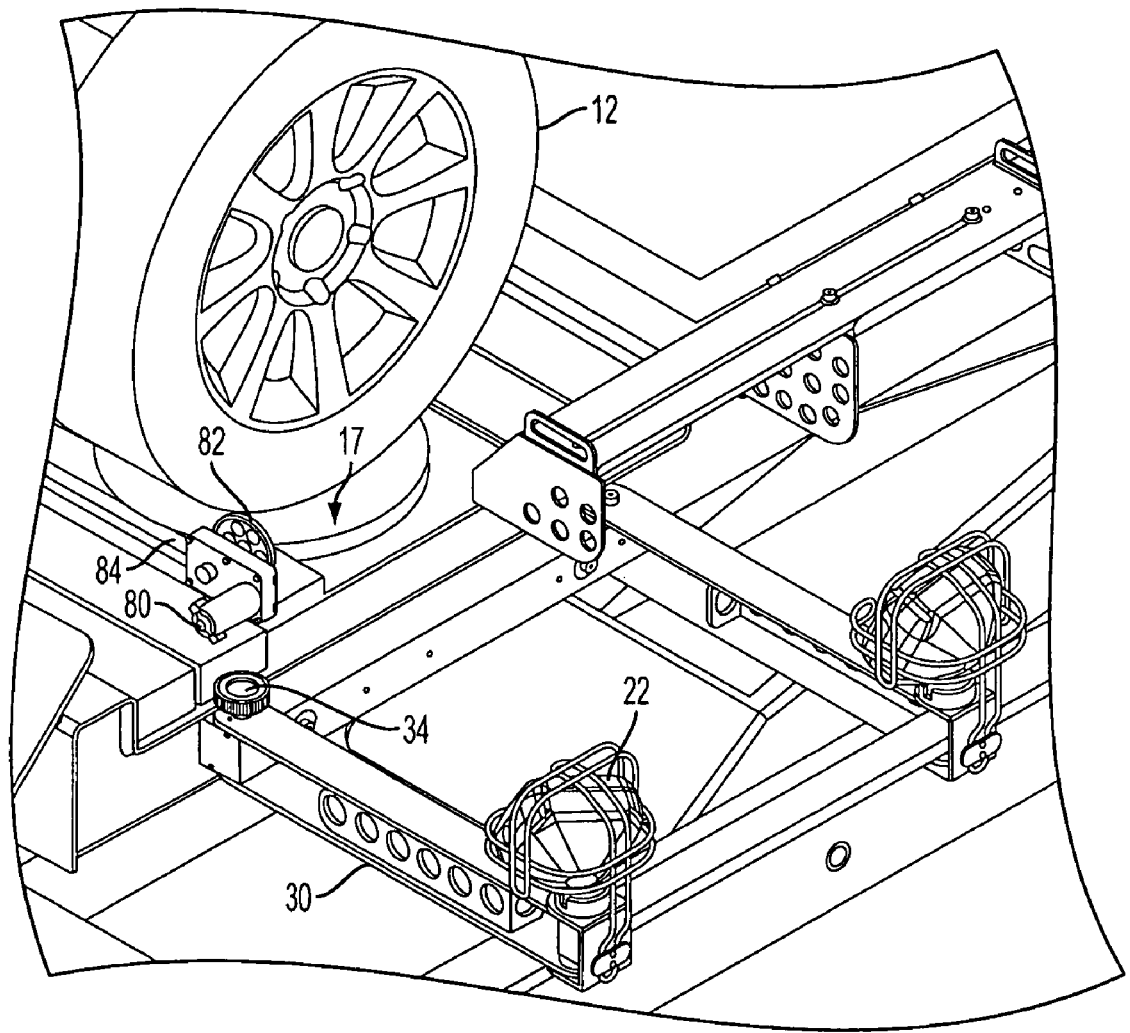
FIG. 10 is a partial perspective view of a turntable positioning apparatus in accordance with the present invention.

After measurements of the wheel locations with respect to the pods have been obtained, and the relationship between the pods with respect to the lift rack has been calibrated, the turntables are positioned in or out to place them at the correct width for the vehicle to be measured. FIG. 10 is a partial perspective view of a turntable positioning apparatus that may be implemented for this purpose. Front wheel 12 is shown positioned on turntable 17 after the turntable has been properly positioned. Motor 80 and pinion 82 are attached to the turntable 17. Track 84 is mounted on a beam of the lift rack that is perpendicular to the longitudinal direction. The turntable is driven in this perpendicular direction by interaction between the track 84 and the pinion 82, which is driven by motor 80 under controller of CPU 70 and motor controller 72, as illustrated in FIG. 9.

If the wheel cannot be properly sensed when the car is driven by the cameras, or measurement is to be made of a vehicle that is already on the lift rack, a search procedure can be undertaken. Several sweeps of multiple images of the wheel (or wheel markings, target) at different illumination levels are made to ensure that proper sensing illumination is achieved. The sweeps are implemented by activation of motor 66 in response controller 72, CPU 70, and limit switches 78. Illumination levels can be set empirically, depending on camera sensitivity, dynamic range, light output and reflectance or absorption of light by the object being observed. After a sufficient number of sweeps, the deployment mechanism is moved a pre-defined distance and the sweep illumination procedure is repeated. The distance moved should be smaller then the field of view of the camera to ensure that movement does not miss the object. This procedure continues until the wheel image has been acquired or if the end of travel has been reached. In the latter case, direction is reversed and the sweep procedure continues. Once the desired object has been acquired, measurement can be made of the distance that the wheel is offset from ideal location in the camera's field of view and the deployment mechanism is moved in the appropriate amount and direction for tracking.

Wheel offset with respect to the cameras may be determined upon obtaining an image of the wheel rim by one of the cameras. As the wheel rim is circular and the approximate radius is known, the angle at which the circle is foreshortened is measured. This angle is then converted to offset distance. With the use of the second camera of the module, the rim can be identified in foreshortened images by both cameras. A triangulation on the wheel features provides a further "fit" to optimize the measured location of the wheel.

Many of the features described above make the total alignment measurement easier, but not all features are required. At least one pod should be provided per wheel, each pod containing at least one camera to provide an image of the wheel. A gravity gauge, and at least one angular measuring device to measure the angle of the pods with respect to each other in a plane essentially horizontal, should be provided. The pod can be attached to the rack with arms that move on a track attached to the rack, or the pod can be attached to an arm attached to the rack and a pivot point essentially in the middle of the pod which lets the cameras twist and scan horizontally for the wheel.

Figure 11:
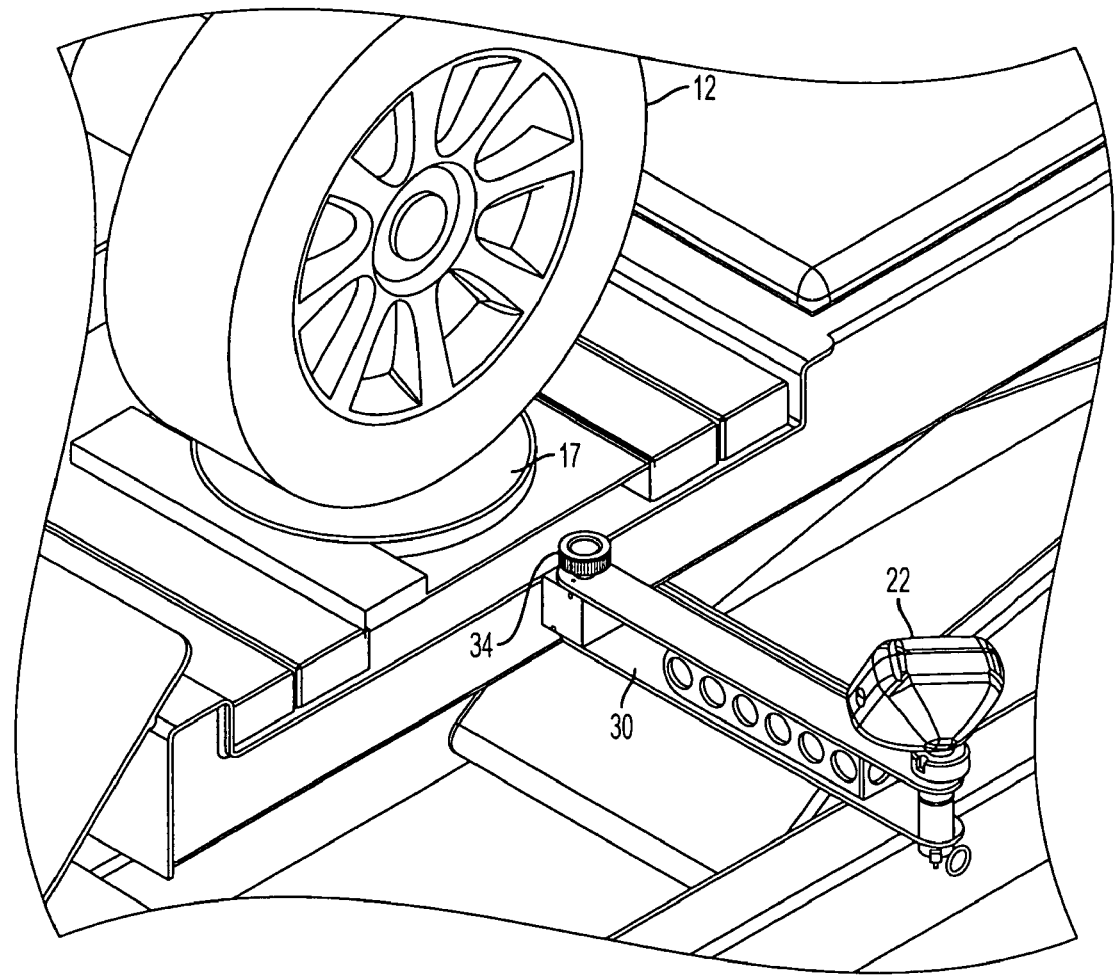
FIG. 11 is a partial perspective view of another embodiment in accordance with the present invention.

FIG. 11 is a partial perspective view of this variation. The module includes a single arm 30 to which sensor pod 22 is pivotably mounted at the end remote from the lift. The arm can be retracted when not in use or extended when in use, in the manner previously described, and held in position by locking knob 34. The technician may move of the pod pivotally or angularly and then lock it in place for the remainder of the measurement of that vehicle. Alternatively, such movement can be done automatically with servos, motors, pistons, or other moving devices, controlled in a manner as described with respect to FIG. 9.

Figure 12:
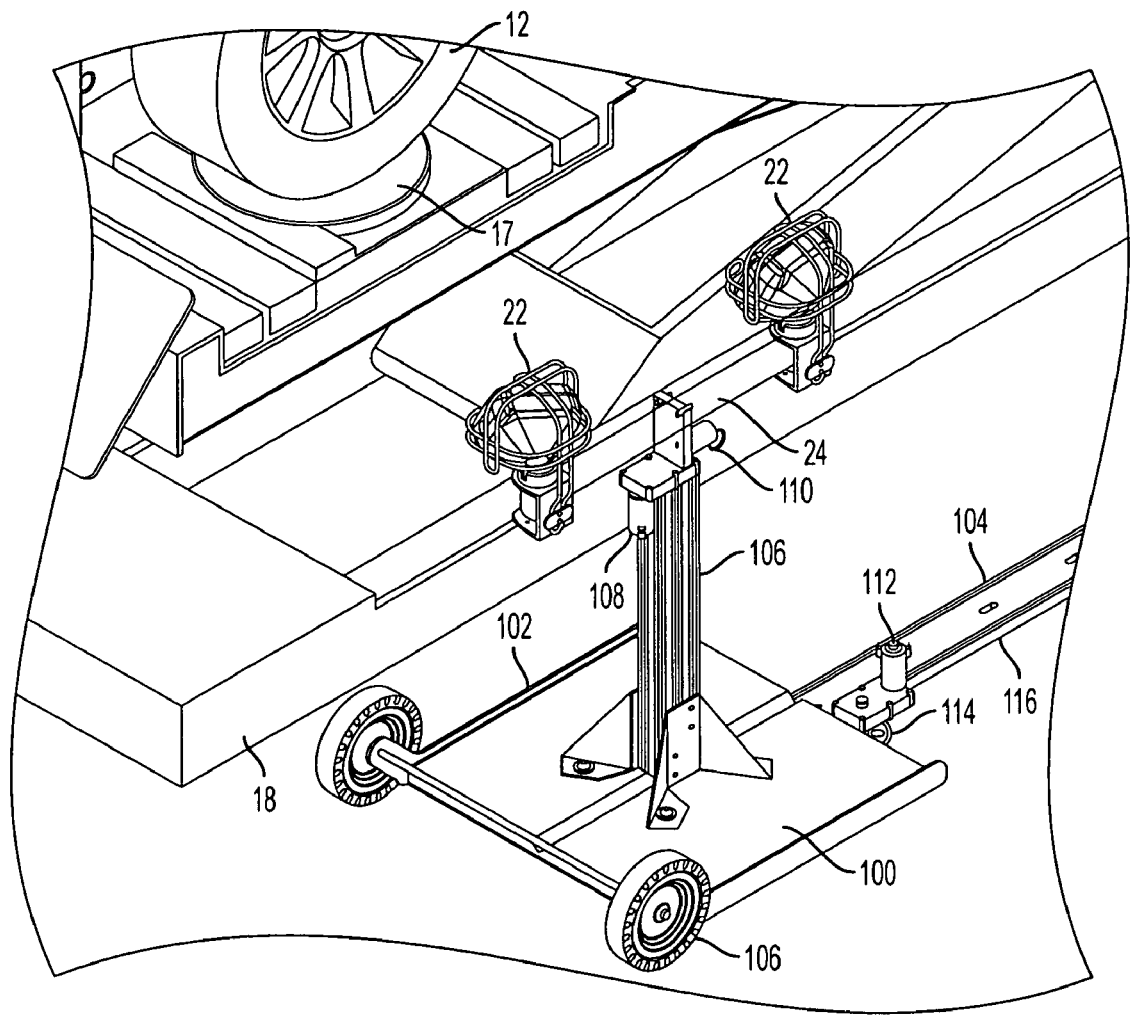
FIG. 12 is a partial perspective view of another embodiment in accordance with the present invention.

There may be instances in which attaching the camera module to the side of the rack is not practical, as there might be air hoses and other objects already on the rack that make mounting difficult. In some cases, one might want to move the system from one rack to another and thus not want a fixed mount to the rack. In these cases, the camera module can be placed on a stand beside the vehicle. FIG. 12 is a partial perspective view of this variation.

Stand assembly 100 includes a base 102 that is positioned about track 104, which is parallel to the lift rack, and supported by wheels 106. Bar 24, which holds the pod sensors 22 at a fixed distance, is supported at a defined height by vertical beam 106. Motors 108 and 110 can be controlled by the CPU 70 to manipulate the orientation (in yaw and pitch) of the camera module to acquire and track the wheels. Motor 112, affixed to base 102 is engageable with pinion 114 to movably position the stand assembly along track 104 through interaction between the pinion and rack 116 affixed thereto. Motor 112 may also be under the control of CPU 70 as described in connection with FIG. 9.

Each module sensor pod of the systems disclosed may contain a gravity gauge 50, as described above with respect to FIG. 7. Once the position of the wheel is known with respect to the camera, wheel camber can be measured with the use of the gravity gauges. As the relative location of the camera to the gravity gauge measurement is known by previous calibration, the relative location of the camera(s) to wheel is all that is needed to calculate the camber of each wheel.

Calibration of the camber gauge can be performed by placing a wheel in the field of view of the module camera(s). By use of a gravity gauge attached to the wheel, the wheel is adjusted to align with a vertical plane (zero camber). By then measuring the angle of the wheel in the camera(s) and measuring the current reading of the gravity gauge, a correction factor is obtained. This correction factor is subtracted from relative readings of the wheel and camber gauge on subsequent measurements to calculate the current camber of the wheel being viewed.

Each module pod contains a set of toe gauges similar to ones found in conventional aligners. There can be a minimum of six total toe gauges for the complete system. The use of eight toe gauges can provide a level of redundancy, useful if one set is blocked. Another set per pod can provide an inter-pod calibration or a calibration check. The toe gauges establish the reference of each pod with respect to each other (angularly) in the toe plane (horizontal plane). The toe gauge may comprise a linear camera and at least one LED on each pod, or an area camera and at least one LED, or a laser and sensor, or any of conventional aligners used in well defined methods. The camera(s) in each sensor pod obtain an image of the wheel. By finding wheel features, the wheel is located with respect to the pods. From knowledge of the "toe" orientation of each of the pods measured from the toe sensors in the pods and the relative location of the wheel in the camera's two sets of measurements, and the previously calibrated toe sensor measurement to camera orientation, the toe (and related measurements; thrust angle. etc.) of the vehicle can be determined.

The relative position of the camera to a toe sensor can be calibrated as follows. A vehicle with known toe, for example 0.00 degrees toe, is used. The system is used to measure toe with respect to the pods and the relative location of the wheel. The actual reading of toe for the wheel can be calculated from the measurement of the toe gauges of the pod, the relative position of the wheel to the cameras, and the toe to camera correlation. A correction factor is thus established.

Various alignment measurements that can be performed in the present system are described more fully using the following definitions.

A ray R is a straight line in three dimensional space. A ray is defined by a unit vector U in the direction of the ray line, and P, the vector from the origin to a point on the ray line in space. Then vectors from the origin to any point on the line in space are given by:

$$R=P+t*U$$

where t is the distance along the line from P. The point on the ray line P is chosen such that P is normal to U (the dot product of P and U is zero).

Rotating the wheel on its axis defines the wheel axis ray. This is the line in space about which the wheel rotates. The wheel axis vector is a unit vector in the direction of this line. The rim center point is the where the wheel axis ray intersects the rim plane. The rim circle lies in the rim plane.

The coordinate systems (CS) contemplated herein are Cartesian coordinate systems. A Cartesian coordinate system is a three-dimensional coordinate system consisting of an origin point and three orthogonal unit vector axes. When two coordinate systems are being relatively defined, one coordinate system is called the primary coordinate system, and the other coordinate system is called the secondary coordinate system. The unit axis vectors of a primary coordinate system are called the X, Y and Z axes. The unit axis vectors of a secondary coordinate system are called U0, U1 and U2. The origin of the secondary coordinate system is defined by a vector C from the origin of the primary coordinate system.

When one coordinate system is defined relative to another, the center of the secondary coordinate system is defined by a vector C from the origin of the primary coordinate system, and three unit vectors U. The components of C, U0, U1 and U2 are defined relative to the primary coordinate system. The three unit vectors U form a 3×3 matrix. This is the rotation matrix that rotates the base vectors of the primary CS (X, Y, Z) into the base vectors of the secondary CS (U0, U1, and U2).

To transform a vector V defined in the primary coordinate system (vx, vy, vz) to the secondary CS (v0, v1, v2): 1) Subtract C from V; 2) Multiply the result by the transpose of the matrix U. The resulting vector (v0, v1, v2) will be relative to the origin of the secondary coordinate system and its three components (v0, v1, v2) will be components in the U0, U1, and U2 directions.

To transform a vector V (v0, v1, v2) in the secondary coordinate system defined by C and U to the primary CS (vx, vy, vz): 1) Multiply V by the matrix U; 2) add C. The resulting vector will be relative to the origin of the primary coordinate system and its three components (vx, vy, vz) will be components in the primary coordinate system X, Y, and Z directions. In the coordinate system of a camera (CCS), Z is a direction out from the camera towards the vehicle; X and Y are the pixel coordinate directions (Y down).

A wheel (or target) coordinate system is imbedded in the wheel. Looking at the wheel, X is to the right; Y is up; and Z is the outward normal. If a target is normal to a wheel, their Z directions are opposite. A wheel's coordinate system may also be defined as a rim plane coordinate system. A wheel of an automotive vehicle consists of a tire, a wheel rim structure which holds the tire, and a suspension system which connects the rim structure to the vehicle. Looked at from the side, the circle where the wheel rim ends and the tire sidewall begins is called the rim circle. This circle lies in a plane called the rim plane. This rim plane defines a rim coordinate system. The origin of this coordinate system is the center of the rim circle. The outward normal to the rim plane is the Z axis of the rim coordinate system. The X and Y axes are any two unit vectors lying in the rim plane, normal to the Z axis and each other.

The vehicle coordinate system is imbedded in the vehicle. The center points of the wheel lie in the XY plane of the vehicle coordinate system. Z points up. Y is the Geometric Center Line (GCL) drawn from the midpoint of the rear rim centers to the midpoint of the front rim centers. X is the Geometric Center Line Perpendicular (GCLP). The Z axis of the vehicle coordinate system is defined as the upward direction of the gravity vector, or the upward normal of the lift rack plane.

From calibration, the relative orientations of the camera coordinate systems and the Z axis of the vehicle coordinate system are known. The X and Y axes of the vehicle coordinate system may be rotated about the Z axis of the vehicle coordinate system without changing the Z axis of the vehicle coordinate system. A method of defining their specific directions is defined as follows: For each wheel, get the wheel plane coordinate system (target plane or rim plane) in the CCS. Get the center point between the two front wheel planes and the center point between the two rear wheel planes in the camera coordinate system. Define the Y axis of the vehicle coordinate system as the unit vector from the rear center point to the front center point. The X axis of the vehicle coordinate system (GCLP) is then the vector cross product of the Y and Z unit vectors. The VCS origin is defined as the midpoints of the front and rear center points. The vehicle dimensions (front and rear left to right widths, and front to rear length) are known for the specific vehicle. The wheel axes are defined as either unit vector about which the wheel rotates. This axis is measured as the axis about which a target affixed to the wheel rotates, or is defined as the normal to the rim plane.

Alignment parameters may be determined from interaction among the various coordinate systems described above. For all four wheels, toe line and camber may be computed in the following manner. Individual toe line unit vectors are defined by projecting the wheel axis vectors onto the vehicle coordinate system XY plane and rotating by 90°, clockwise on the left side, counterclockwise on the right. The x component of the toe line vector is the vehicle coordinate system Y (vehicle forward) component of the wheel axis vector, negated for the right side wheels. The Y component of the toe line vector is the absolute value of the vehicle coordinate system X (vehicle side) component of the wheel axis vector. The Z component of the toe line vector is set to zero, and the toe line vector is then normalized. With this definition, the toe angle, measured positive from toe line X towards toe line Y, increases from zero as the wheel axis vector component in the vehicle forward direction increases.

Camber is the inward or outward tilt angle of the wheel off of the vertical direction (vehicle coordinate system Z), positive if the top of the wheel tilts outward. It is thus computed as the angle whose sine is the Z component of the wheel axis unit vector in the vehicle coordinate system.

For the two front wheels, caster is the forward or rearward tilt angle of the steering axis off of the vertical direction (vehicle coordinate system Z), positive if the tilt is rearward at the top (clockwise off vertical as viewed from the left side of the vehicle). Caster is thus computed as the angle (in degrees) between the projection of the steering axis on the vehicle coordinate system YZ plane and vehicle coordinate system Z.

SAI (Steering Axis Inclination) is the inward or outward tilt angle of the steering axis off of the vertical direction (vehicle coordinate system Z), positive if the tilt is inward, clockwise off vertical on the left, counterclockwise on the right, as viewed looking forward (vehicle coordinate system Y). It is thus the angle of the steering axis on the vehicle coordinate system XZ plane and vehicle coordinate system Z, negated for the right side. Thrust Line is the unit vector bisecting the rear individual toe line unit vectors. Thrust Angle is the angle between the thrust line and GCL (vehicle coordinate system Y). It is computed as the angle whose tangent is the ratio of the vehicle coordinate system X and Y components of the thrust line unit vector.

Front toe angle is the angle between the thrust line and the individual front toe line. "Toe in" is positive, so the left front toe angle is positive clockwise off the thrust line, and the right front toe angle is positive counter-clockwise. Toe angle is computed as the angle between the toe line and thrust line unit vectors, multiplied by the sign of the difference between the vehicle coordinate system X components of the toe line and thrust line. Rear toe is the same as front, except that the thrust line is replaced by the GCL (vehicle coordinate system Y). Total front or rear toe is the angle between the individual toe lines, computed as the sum of the toe angles.

Setback is the angle between the front or rear axis unit vector (normalized vector between rim center points in the vehicle coordinate system) and the GCLP (vehicle coordinate system X), positive when the right wheel is "set back" from the left wheel. It is computed as the angle whose tangent is the ratio of the vehicle coordinate system X and Y components of the front or rear axis unit vector.

Steering angle is the angle in degrees between the bisectors of the front and rear individual toe lines, i.e. the angle between the bisector of the front individual toe line and the thrust line, which is the bisector of the rear individual toe line. It is computed as the angle between the line bisecting the front toe line unit vectors and the thrust line unit vector. For each front wheel, the steering axis in the vehicle coordinate system is computed as the ray about which the wheel target plane rotated from the right to the left caster swing position, always defined to point upward (positive vehicle coordinate system Z component).

To acquire the data necessary to compute the parameters of interest, the position of wheels relative to a vehicle coordinate system (VCS) must be determined. Thus, the system acquires the position of each wheel relative to one or more cameras. The relative positions of the cameras with respect to each other is known by calibration methods to be described hereinafter. Also, the positions of the cameras relative to the VCS is determined by calibration methods to be described. One camera, or a group of cameras, is dedicated to each wheel to make the measurements for that wheel. Such a group of cameras, even if there is only one camera in the group, is called a pod. The relative positions of the cameras in such a pod is determined by a calibration procedure to be described. Additional cameras, or other calibration procedures to be described, are used to establish the relative positions of these pods with respect to each other, so that the relative position of any pod with respect to the VCS may be defined.

A process of measuring a target coordinate system relative to a camera coordinate system has been described in the commonly assigned patents previously identified herein. This process requires a target assembly to be attached to the wheel and imaged by one or more cameras. This target assembly consists of a plurality of visible markers. The spatial relationship of these markers to each other is well known and accurately defined for a particular target. The relative positions of the cameras is known by calibration procedures described in the referenced patents.

Alternative embodiments allow one or more cameras to image the wheel and acquire equivalent information, in particular, the position of the rim plane relative to the cameras' coordinate system (CCS). Three such measurement embodiments are described more fully below. The first embodiment requires no additions or modifications to the wheel. In this embodiment, a camera or cameras image the wheel as is. The position of the rim plane relative to the camera coordinate system is measured by a process to be described. In the second embodiment, a plurality of visible markers are individually affixed to the surface of the wheel or wheel rim and imaged by a plurality of cameras. The spatial relationship of these markers to each other is not known or pre-determined, but, once affixed, these markers remain fixed relative to each other during the measurement process. Their positions relative to the CCS are measured by a process to be described. Since these markers and the rim plane form a rigid body, the position of the rim plane relative to the cameras' coordinate system can be determined by a calculation to be described. In the third embodiment, a pattern of light is projected onto the wheel and imaged by a plurality of cameras. The position of the projector relative to the cameras can be made known by a calibration procedure to be described. The position of points on this pattern on the wheel surface is determined by a method to be described. This collection of three dimensional points defines the surface of a three dimensional object that can be identified with the known surface shape of a wheel. The position of this shape defines the position of the rim plane relative to the camera CCS.

In the first measurement embodiment, there are no additions or modifications to the wheel, and one or more cameras image the wheel as is. The position of the rim plane relative to the camera CCS is measured by the following process. The outward normal to the rim plane is the U2 axis of the rim coordinate system. The U0 and U1 axes are any two unit vectors lying in the rim plane, normal to the U2 axis and each other. Due to the symmetry of a circle, only the center and the U2 axis need be uniquely defined. The U0 and U1 axes can be rotated about the normal by an arbitrary angle without changing the rim circle center or normal, unless an additional feature in the plane can be identified to define the orientation of these two vectors. This rim coordinate system (rim CS) is taken as the secondary coordinate system, and the camera CCS is taken as the primary coordinate system. The focal point of the camera is the origin of the CCS, and the directions of the camera's rows and columns of pixels define the X and Y axes, respectively. The camera image plane is normal to the Z axis, at a distance from the origin called the focal length. Since the rim circle now lies in the rim plane, the only additional parameter needed to define the rim circle is its radius.

For any position and orientation of the rim CS relative to a CCS in that camera's field of view, the rim circle projects to a curve on the camera image plane. Edge detection means well known in the optical imaging field are employed to find points in the camera image plane lying on this curve. The following method may be used to find and measure points on this curve to sub-pixel accuracy.

The sidewall portion of the tire is adjacent to, and radially outward from the rim circle. Such sidewalls typically have different optical properties than the rim material. Thus the intensities of the pixels in the sidewall segments of the image differ from the intensities of the pixels in the rim segments of the image. A plurality of closely spaced line segments of pixels, each crossing the sidewall-rim interface at approximately right angles to the rim edge curve in the image, is defined in the image data processing system. These lines span the whole closed curve of the rim edge in the image. For each such line of pixels, a subset consisting of a fixed number of contiguous pixels is defined. This defined subset is moved along the line of pixels until the following conditions are met: all pixels in a contiguous group at one end of the segment are identified as sidewall; all pixels in a contiguous group at the opposite end of the segment are identified as rim. The following definitions are set forth for making these determinations.

Is=Average intensity of the sidewall pixels.
Ir=Average intensity of the rim pixels.

$$\text{Threshold}(T)=(Is+Ir)/2.$$

I1 and I2=Intensities of two contiguous pixels such that: I1<=T and I2>=T.

$$F=(T-I1)/(I2-I1).$$

Then the sub-pixel position of the edge point along this line of pixels is: F+Integer position of pixel with intensity I1. Given this set of edge points in the camera image plane (XY plane of the CCS), the relative position of the rim CS is determined as follows:

Let the rim CS be defined relative to the CCS by:
C=Vector to rim CS center.
U2=Normal axis of rim CS.
rr=Radius of rim circle in rim plane CS.

Then any vector from the origin of the CCS to a point in the rim plane is given by: R=C+Q, where Q is a vector lying in the rim plane. Since Q is in the rim plane, it is normal to U2.

The origin of the CCS is the focal point of the camera. The camera image plane is normal to the Z axis of the camera and intersects the CCS Z axis at a distance f from the CCS origin, where f is the focal length of the camera. Then:

xi,yi,f=CCS coordinates of the ith rim edge point in the CCS.

Let V be the vector from the CCS origin to this point on the camera image plane. The components of V in the CCS are then (xi,y1,f). Extend this vector to the rim plane:

k1*V=Extended vector from origin of CCS to point on rim plane.

Since this point lies in the rim plane, k1*V=C+Q. Since Q is normal to U2:

$$k1*V*U2=C*U2,$$

$$k1=(C*U2)/(V*U2),$$

$$Q=k1*V-C.$$

Let:

$$UQ=Q/|Q|,$$

$$Qrr=rr*UQ.$$

Qrr is a vector in the rim plane, from the rim plane origin, parallel to Q, but whose length is rr. So Qrr lies on the rim circle, and is the closest point to Q in the rim plane.

C+Qrr=Vector from the CCS origin to this point.

V2 is the vector from the CCS origin, parallel to C+Qrr, that intersects the camera image plane. V2=k2*(C+Qrr)=(x,y,f).

Take the Z component:

$$V2z=k2*(Cz+Qrrz)=f.$$

So:

$$k2=f/(Cz+Qrrz),$$

$$x=k2*(Cx+Qrrx),$$

$$y=k2*(Cy+Qrry).$$

On the camera image plane, (x,y) is the projection of the point on the rim circle closest to the measured edge point (xi,yi). (x,y) is a function of (xi,yi) and the vectors defining the rim plane CS: C and U2.

The measured point (xi,yi) should have been the projection onto the camera image plane of a point on the rim circle, so the difference between (xi, yi) and the corresponding (x,y) as defined above, on the camera image plane, is a measure of the "goodness of fit" of the rim parameters (C and U2) to the measurements. Summing the squares of these differences over all measured points gives a goodness-of-fit value:

$$\Phi=\Sigma((xi-x)2+(yi-y)2)\ i=1,\ldots,N,$$

where N is the number of measured points. A "least-squares fit" procedure, well known in the art, is used to adjust C and U2, the defining parameters of the rim circle, to minimize $\Phi$, given the measured data set {xi,yi} and the rim circle radius rr.

In a variation of this embodiment, two or more cameras whose relative positions are known by a calibration procedure can image the wheel and rim and the data sets from these two cameras can be used in the above calculation. In this case:

$$\Phi=\Phi0+\Phi1+\ldots+\Phi n,$$

where $\Phi$o is defined above for camera 0, and $\Phi$1 thru $\Phi$n are similarly defined for the other cameras, with the following difference: the rim plane C and U2 used for the other cameras are transformed from the CCS of the first camera into the CCS of the other camera. The CCSs of the other cameras are defined (by a calibration procedure) relative to the CCS of the first camera.

The rim plane and circle have now been determined based on multiple sets of curve point data, comprised of sets of measured points, in camera image planes, and thus spatial characteristics of the rim plane and circle are now known. As the rim plane and circle are part of the wheel assembly (including wheel rim and tire), spatial characteristics of the wheel assembly can be determined based on the spatial characteristics of the rim plane and circle.

In the second measurement embodiment, a plurality of visible markers are individually affixed to the surface of the wheel or wheel rim and imaged by a plurality of cameras. The spatial relation of these markers to each other is not known or predetermined, but, once affixed, these markers remain fixed relative to each other during the measurement process. Their positions relative to the camera CS are measured. Since these markers and the rim plane form a rigid body, the position of the rim plane relative to the CCS can be determined by calculation. This measurement method is more fully described, for example, in U.S. Pat. No. 5,724,129 to Matteucci.

In the third measurement embodiment, a pattern of light is projected onto the wheel and imaged by a plurality of cameras. The position of the projector relative to the cameras is known by a calibration procedure. The position of points on this pattern on the wheel surface is determined. This collection of three-dimensional points defines the surface of a three-dimensional object that can be identified with the known surface shape of a wheel. The position of this shape relative to the VCS defines the position of the wheel plane relative to the cameras CCS. This measurement method is more fully described in U.S. Pat. Nos. 4,745,469 and 4,899,218, both to Waldecker.

Various techniques may be used to derive the determinations made in the three measurement embodiments discussed above. To acquire the data necessary to compute the parameters of interest, the position of wheels relative to a vehicle coordinate system (VCS) must be determined. To do this, two relative positions must be known: 1) The position of the wheel CS relative to the camera CS(CCS), and 2) the position of the CCS relative to the VCS. Given this information, the positions of the wheels relative to the VCS can be defined by the following calculation.

Given a primary (such as the vehicle) CS, and an intermediate (such as the camera) CS defined relative to the primary CS, and an object (such as the rim) CS defined relative to the camera CS, the position of the rim CS relative to the vehicle CS is determined as follows: In the vehicle CS, with axes X,Y and Z and origin at (0,0,0), the camera CS is defined by vector CC from the origin of the VCS to the origin of the CCS, and axes UC0, UC1 and UC2. Elements are defined with respect to the VCS as follows:

$$CC=CCx*X+CCy*Y+CCz*Z$$

$$UC0=UC0x*X+UC0y*Y+UC0z*Z$$

$$UC1=UC1x*X+UC1y*y+UC1z*Z$$

$$UC2=UC2x*X+UC2y*Y+UC2z*Z$$

Matrix UC is defined as:

|UC0x UC1x UC2x|

|UC0y UC1y UC2y|

|UC0z UC1z UC2z|

In the CCS, with axes UC0, UC1 and UC2 and origin at CC, the RCS is defined by vector CR from the origin of the CCS to the origin of the RCS, and axes UR0, UR1 and UR2. Elements are defined with respect to the CCS as follows:

$$CR=CR0*UC0+CR1*UC1+CR2*UC2$$

$$UR0=UR00*UC0+UR01*UC1+UR02*UC2$$

$$UR1=UR10*UC0+UR11*UC1+UR12*UC2$$

$$UR2=UR20*UC0+UR21*UC1+UR22*UC2$$

Matrix UR is defined as:

|UR00UR10UR20|

|UR01UR11UR21|

|UR02UR12UR22|

Given the CCS so defined relative to VCS, and the RCS so defined relative to the CCS, standard matrix algebra gives the RCS defined relative to VCS by:

$$URinVCS=UC*UR$$

$$CRinVCS=(UC*CR)+CC$$

The RCS relative to the CCS, i.e. the position of a wheel relative to a camera, is measured by the system by one of the exemplary methods of the embodiments described above. Thus, to determine the position of that wheel (RCS) relative to the VCS, as required for the vehicle parameter measurements described above, it is necessary to know the position of the camera (CCS) relative to the VCS.

If multiple cameras are used to measure the same object, such as a wheel, the measurements of the additional cameras can be expressed as measurements in the first camera's CS by the same mathematical relations as above, with the first camera CS in place of the VCS, and the additional camera CS in place of the camera CS, in the above mathematical expressions. These positional relations between cameras are called Relative Camera Position, or RCP.

The relative position of a camera with respect to the VCS, and the relative positions of cameras with respect to each other (RCP) are determined by the following calibration techniques.

One camera, or a group of cameras, is dedicated to each wheel to make the measurements for that wheel. Such a group of cameras, even if there is only one camera in the group, as noted earlier, is called a pod. The relative positions of the cameras in the pod are fixed and permanent with respect to each other. To determine these fixed intrapod RCPs, one camera in the pod is defined to be the primary camera, and the RCP of each other camera is determined with respect to the primary camera by positioning a target so that part or all of the target is simultaneously visible in the field of view of both cameras.

Alternatively, the measurement pods may commonly view a multifaceted solid with known unique markings on each face. The positional relationships between markings on each face of the solid are predetermined and stored in the computer. Since the relative positional relationships between the markings on each face of solid are predetermined and known, and the relative positions of each pod with respect to the solid are know by measurement, the relative positions of the measurement pods with respect to each other can be determined.

Alternatively, a target is placed in the field of view of one camera of the pair, then moved by a known amount to a position in the field of view of the second camera. Since the movement is known, the measured position of the target as seen by one camera can be defined in the CS of the other camera even if, in this physical position, the target is not in the field of view of the other camera.

Other common types of objects with known geometrical characteristics can be used for performing the calibration process, such as, for example, a reference platform with known grid lines. Other approaches that can be used to determine the relative positions between the measurement pods and cameras are described in commonly assigned U.S. Pat. No. 5,809,658 to Jackson et al., entitled "Method and Apparatus for Calibrating Alignment cameras Used in the Alignment of Motor Vehicle Wheels," issued to Jackson et al. on Sep. 22, 1998; and in commonly assigned U.S. Pat. No. 6,968,28, to Jackson et al., entitled "Self-calibrating, multi-camera machine vision measuring system."

In any case, the "same" target position (TCS) is known in the CS of both cameras. Given the TCS defined relative to CCS1 (the CS of the primary camera), and the TCS defined relative to CCS2 (the CS of the other camera), CCS2 defined relative to CCS1 is defined as follows:

Let CT1 and UT1 be the center vector and matrix of the target CS in CCS1, and CT2 and UT2 be the center vector and matrix of the target CS in CCS2, and UT2T be the transpose of UT2.

$$U2inCCS1=UT1*UT2T$$

$$C2inCCS1 = (U2inCCS1 * CT2) + CT1$$

C2inCCS1 is the vector from the origin of CCS1 to the origin of CCS2, defined in CCS1. U2inCCS1 is the matrix of axis unit vectors CCS2, defined in CCS1.

This intra-pod calibration defines the RCP of any camera in a pod with respect to the primary pod camera. Thus all measurements by any camera in the pod can be related to measurements of the primary pod camera.

Inter-pod calibration defines the RCP between the primary camera in one pod and the primary camera in another pod, such as between pods viewing different wheels. Calibration techniques differ, depending upon whether the relative position of the two pods is fixed and permanent, referred to herein as fixed pod case, or the relative position of the two pods can vary from measurements of one vehicle to another vehicle, referred to herein as non-fixed pod case.

In the fixed pod case, inter-pod RCP need only be measured once, by the same methods as described above for intra-pod RCP. In the non-fixed pod case, inter-pod RCP must be determined anew for each vehicle measurement. For this case, alternative techniques may be applied.

In a first inter-pod RCP determination technique, one pod includes a camera that views a target incorporated in the second pod. The RCP of this calibration camera to the primary camera in the same pod is determined by the methods described above. The position of the target rigidly attached to the second pod relative to the cameras in that pod, called Relative Target to Camera Position, or RTCP, is determined as follows. A camera external to the pod views both the target attached to the pod, and another target, also external to the pod. Using the mathematical methods described above, the relative positions of the external target and the target attached to the pod, called the Relative Target to Target Position, or RTTP, is determined.

This external target is also in the field of view of a pod camera, so the position of the external target relative to the pod camera is measured. The external target is used as the intermediate CS as described above, and the position of the target attached to the pod is thus calculated relative to the pod camera. Given the relative position of the calibration camera to the camera(s) in the first pod, the relative position of the target attached to the second pod as measured by the calibration camera in the first pod, and the relative position of that attached target to the camera(s) in the second pod, the RCP of the camera(s) in the second pod is determined by the mathematical methods described above.

The above calibration gives the relative camera positions (RCPs) of all cameras in the system with respect to one camera. This is equivalent to having one big camera CS with respect to which all the wheel rim CSs are measured. The VCS can then be defined relative to this CS, and vice versa, as follows. The center points of the wheel rim CSs are all measured and hence known in the CCS. These rim CS center points, known relative to the CCS, lie in the XY plane of the VCS. The normal to that plane is the Z axis of the VCS. The VCS Y axis, which is the GCL (Geometric Center Line) of the vehicle, is defined in the CCS by the line drawn from the midpoint of the rear rim centers to the midpoint of the front rim centers. The VCS X axis, which is the GCLP (Geometric Center Line Perpendicular) of the vehicle, is the vector cross product of the VCS Y axis and the VCS Z axis. The direction of the VCS X axis is from the left toward the right side of the vehicle, so the VCS Z axis points upward. The VCS origin is defined as the midpoints of the front and rear center points. The VCS relative to the CCS is thus defined, as required.

The VCS Z axis may be defined to be the upward direction of gravity. This direction is determined by use of a gravity gauge. The gravity gauge outputs a measurement, readable by the electronic data processing part of the system, indicating the orientation of the body of the gravity gauge with respect to the direction of gravity. To calibrate the orientation of a camera relative to the direction of gravity, the gravity gauge and camera are both rigidly attached to a structure such as a camera pod. One or more pod cameras image a target whose orientation with respect to the direction of gravity is known. The target may incorporate a linear structure visible to the camera(s) which is free to move under the influence of gravity to a position at which the linear structure aligns with the direction of gravity. The direction of this line, measured in the CCS from the camera images, gives the direction of gravity in the CCS. The simultaneous reading of the gravity gauge gives the relation between the gravity gauge data and the orientation of the CCS with respect to gravity, and vice versa.

Alternatively, the VCS Z axis may be defined to be the upward normal to the plane on which the vehicle is supported. This normal direction is determined by imaging three or more points on the supporting plane simultaneously by two or more cameras with known RCP. Triangulation then defines the position of these points, and hence the plane in which they lie, with respect to the CCS. The normal to this plane, which may be chosen as the VCS Z axis, is thus known relative to the CCS.

In yet another variation, a target in the field of view of one or more cameras (whose RCP is known) is attached to a support structure, such as a tripod, which stands and is free to move on the plane supporting the vehicle. Such a supported target may be rotated about an axis normal to the vehicle support plane. The camera measures the target plane relative to the CCS in two or more of these rotated positions, and the axis of rotation, which is the normal to the vehicle support plane, and may be chosen as the VCS Z axis, is thus known relative to the CCS.

For any of these definitions of the VCS Z axis, the VCS Y axis (the GCL) is defined as above, and the VCS X axis is then defined, as described above, by the vector cross product of the VCS Y axis and the VCS Z axis. Given the VCS so defined and measured, the vehicle alignment parameters are then derived as described earlier.

In a second inter-pod RCP determination technique, the relative position of each pod CS with respect to the VCS is determined directly. Additional gauges may be incorporated in the pods, such as gravity and toe gauges. The RCPs of the cameras within a pod are still known, as described above. The use of the gravity gauges to define the VCS Z axis with respect to the pod cameras has been described above, as has the definition of toe.

A toe gauge may comprise a light source in one pod, and a linear light detecting array rigidly attached to a focal slit collimator in another pod. The orientation of this linear array and slit assembly is such that the line of the slit is in the direction of gravity, and the line of the detector array is normal to gravity. Light from the source in one pod passes through the slit in the other pod and illuminates one location on the linear detector array. Such array and slit assemblies are commonly available and are internally calibrated as part of their manufacturing process so the following parameters are known: F: the normal distance from the slit to the array; D0: the position of the point on the line of the detector array such that the line from that point to the slit is normal to the line of the detector array.

When light from the source in the other pod passes through the slit it produces a narrow illuminated region on the detector array. Electronics that are part of the array determine: D: The position of the point on the line of the detector array at the center of illuminated region. Then:

$$\tan (A) = (D - D0)/F$$

where A is the angle of the light beam, and hence a straight line in the VCS XY plane, from the other pod with respect to the normal to the line of the array.

Two such detector assemblies, and two light sources, are incorporated in each of the four pods associated with and adjacent to each wheel of the vehicle. The angles of each of the four sides of the vehicle are measured by pairs of detector assemblies located on corresponding pods. Only three of these measurement pairs are required to obtain all of the desired wheel alignment information related to the vehicle being measured. The additional sensor pair provides redundant information that can be used to check the calibration of the system. Alternatively, the alignment system can be configured using only three sensor pairs. Angles measured by the detector assemblies are in the VCS XY plane. The position of the rim plane of each wheel is determined relative to the corresponding pod cameras in the CCS as previously described. The relative position of each pod to its corresponding detector assembly is know by prior calibration. Therefore, the relative position of the rim plane to the VCS can be determined. Alternatively, the position of the rim plane with respect to the detector array can be determined by the measured rim plane position relative to the corresponding pod and the known relationship of the pod to the corresponding detector array. This relationship can be used with the angles measured by the detector arrays to compute the vehicle wheel alignment information as described in detail in U.S. Pat. No. 5,519,488 to Dale.

It is to be understood that the present invention is capable of use in various other combinations and environments and is capable of changes or modifications within the scope of the inventive concept as expressed herein. For example, the fixed distance between the pair of sensors of a module need not be set at the diameter of a vehicle wheel, so long as each of the sensors has sufficient field of view of the wheel characteristic image. Individual protective covers for respective sensing modules may be spaced to avoid relocation of a module to be stowed. The concept of retracting the module when not in use is applicable to other stowed positions, for example, without longitudinal displacement. Although each module has been shown to comprise two cameras to obtain high accuracy, a single camera may be employed in each module. Fewer gravity sensors can be used in cases where the location of a camera is known by the system with respect to another camera. In another variant, a single axis gravity sensor may be predominantly mounted perpendicular to the rack centerline, thus measuring the gravity generally in the camber plane of the vehicle. In this variation, only one of the camera modules would need a gravity gauge.

What is claimed is:

1. A vehicle wheel alignment sensing system for use with a vertically adjustable vehicle supporting lift, the system comprising:

an optical sensing mechanism operably coupled to the supporting lift for movement in unison with the lift, the sensing mechanism comprising at least one sensing module having a field of view that encompasses a wheel of a vehicle positioned on the lift; and a deployment mechanism coupled between the lift and the sensing module, said deployment mechanism having an extended position in which the sensing module extends outwardly from the lift for viewing the wheel during an alignment procedure and a retracted position adjacent the lift for stowing.

2. An alignment sensing system as recited in claim 1, wherein the sensing module comprises a pair of sensors positioned at a known orientation with respect to each other.

3. An alignment sensing system as recited in claim 2, wherein the pair of sensors are positioned at a fixed distance from each other.

4. An alignment sensing system as recited in claim 2, wherein the sensors comprise cameras.

5. An alignment sensing system as recited in claim 4, further comprising a plurality of said sensing modules coupled to the supporting lift for viewing respective wheels of the vehicle.

6. An alignment sensing system as recited in claim 5, wherein the fixed distance is set to place the pair of sensors along a longitudinal direction of the lift proximate opposite ends of the wheel diameter, whereby the field of view of each sensor encompasses a substantial portion of the wheel.

7. An alignment sensing system as recited in claim 6, further comprising a mounting member attachable to one side of the lift, the mounting member comprising a plurality of positions for securely mounting a pair of said sensing modules.

8. An alignment sensing system as recited in claim 7, wherein a mounting member position for at least one of the pair of sensing modules is selectable in accordance with the wheel base of the vehicle.

9. An alignment sensing system as recited in claim 7, further comprising a second mounting member attachable to the opposite side of the lift, the mounting member comprising a plurality of positions for securely mounting a pair of said sensing modules.

10. An alignment sensing system as recited in claim 7, wherein the retracted position is displaced in the longitudinal direction from the extended position.

11. An alignment sensing system as recited in claim 10, further including a protective cover attachable to the lift to extend above the sensing module in the retracted position.

12. An alignment sensing system as recited in claim 10, wherein a mounting member position for at least one of the pair of sensing modules selectable to position the pair of sensing modules adjacent to each other in their retracted positions; and the protective cover is configured to extend over both sensing modules in their retracted positions.

13. An alignment sensing system as recited in claim 1, wherein the retracted position is displaced in the longitudinal direction from the extended position.

14. An alignment sensing system as recited in claim 1, further including a protective cover attachable to the lift to extend above sensing module in the retracted position.

15. An alignment sensing system as recited in claim 1, comprising means for locking the deployment mechanism in each of the extended position and retracted position for stabilizing the sensing module.

* * * * *